(12) United States Patent
Luo et al.

(10) Patent No.: US 10,382,767 B2
(45) Date of Patent: Aug. 13, 2019

(54) VIDEO CODING USING FRAME ROTATION

(71) Applicant: GOOGLE LLC, Mountain View, CA (US)

(72) Inventors: Yi Luo, Foster City, CA (US); Hui Su, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 6 days.

(21) Appl. No.: 15/656,270

(22) Filed: Jul. 21, 2017

(65) Prior Publication Data

US 2019/0028714 A1    Jan. 24, 2019

(51) Int. Cl.
| | |
|---|---|
| *H04N 19/17* | (2014.01) |
| *H04N 19/10* | (2014.01) |
| *H04N 19/00* | (2014.01) |
| *H04N 19/176* | (2014.01) |
| *H04N 19/159* | (2014.01) |
| *H04N 19/172* | (2014.01) |
| *H04N 19/119* | (2014.01) |
| *H04N 19/147* | (2014.01) |

(Continued)

(52) U.S. Cl.
CPC ......... *H04N 19/176* (2014.11); *H04N 19/119* (2014.11); *H04N 19/147* (2014.11); *H04N 19/159* (2014.11); *H04N 19/17* (2014.11); *H04N 19/172* (2014.11); *H04N 19/61* (2014.11); *H04N 19/88* (2014.11)

(58) Field of Classification Search
USPC .................................................. 375/240.15
See application file for complete search history.

(56) References Cited

U.S. PATENT DOCUMENTS

| | | |
|---|---|---|
| 7,535,474 B1 | 5/2009 | Scholander et al. |
| 7,576,758 B2 | 8/2009 | Kothandaraman et al. |

(Continued)

FOREIGN PATENT DOCUMENTS

EP    2472867 A1    7/2012

OTHER PUBLICATIONS

International Search Report and Written Opinion in PCT/US2018/022793, dated May 25, 2018, 14 pgs.

(Continued)

*Primary Examiner* — Behrooz M Senfi
(74) *Attorney, Agent, or Firm* — Young Basile Hanlon & MacFarlane, P.C.

(57) ABSTRACT

Video frames are rotated for encoding and decoding blocks therein. During an encoding process, a number of degrees to rotate a video frame is determined. The video frame is rotated to produce rotated pixel values. A prediction residual is then generated for a block to be encoded based on the rotated pixel values. That block is encoded based on the prediction residual. During a decoding process, an encoded block is decoded to produce inverse transform pixel values, and a number of degrees to inverse rotate an encoded video frame is determined. The encoded video frame is inverse rotated to produce inverse rotated pixel values corresponding to the inverse transform pixel values. The inverse rotated pixel values are then outputted to an output video stream. One or more syntax elements indicating the number of degrees can be encoded to a bitstream during encoding and decoded from the bitstream during decoding.

20 Claims, 10 Drawing Sheets

(51) Int. Cl.
  *H04N 19/61* (2014.01)
  *H04N 19/88* (2014.01)

(56) References Cited

U.S. PATENT DOCUMENTS

| | | | |
|---|---|---|---|
| 7,580,578 B1 | 8/2009 | Onno et al. | |
| 8,718,406 B2 | 5/2014 | Bar-Shalom | |
| 2005/0243920 A1* | 11/2005 | Murakami | H04N 19/44 375/240.12 |
| 2007/0133692 A1* | 6/2007 | Reddy | H04N 19/61 375/240.25 |
| 2011/0200100 A1* | 8/2011 | Kim | H04N 19/176 375/240.02 |
| 2012/0230594 A1* | 9/2012 | Boyce | H04N 19/46 382/232 |
| 2013/0127827 A1* | 5/2013 | Shiell | G06T 15/205 345/419 |
| 2013/0266079 A1 | 10/2013 | Huang et al. | |
| 2017/0237992 A1* | 8/2017 | Tjandrasuwita | H04N 19/176 375/240.24 |
| 2017/0302961 A1* | 10/2017 | Ikai | H04N 19/597 |

OTHER PUBLICATIONS

Do-Kyoung Kwon et al., "Frame coding in vertical raster scan order", Joint Collaborative Team on Video Coding (JCT-VC) of ITO-T SG16 WP3 and ISO/IEC JTC1/SC29/WG11, 3rd Meeting, Guangzhou, China, Oct. 7-15, 2010, URL: http:/wftp3.itu int/av-arch/jctvc-site, No. JCTVC-C224 (Oct. 2, 2010), pp. 1-4.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Choong et al., "Efficient Memory Reuse and Sub-Pixel Interpolation Algorithms for ME/MC of H.264/AVC", 2006 IEEE Workshop on Signal Processing Systems Design and Implementation: Banff, Canada, Oct. 2-4, 2006, published Jan. 10, 2006, IEEE, pp. 377-382.

* cited by examiner

1000

| 1 | 2 | 3 | 4 |
|---|---|---|---|
| 5 | 6 | 7 | 8 |
| 9 | 10 | 11 | 12 |
| 13 | 14 | 15 | 16 |

0 DEGREE ROTATION

1002

| 13 | 9 | 5 | 1 |
|---|---|---|---|
| 14 | 10 | 6 | 2 |
| 15 | 11 | 7 | 3 |
| 16 | 12 | 8 | 4 |

90 DEGREE ROTATION

1004

| 16 | 15 | 14 | 13 |
|---|---|---|---|
| 12 | 11 | 10 | 9 |
| 8 | 7 | 6 | 5 |
| 4 | 3 | 2 | 1 |

180 DEGREE ROTATION

1006

| 4 | 8 | 12 | 16 |
|---|---|---|---|
| 3 | 7 | 11 | 15 |
| 2 | 6 | 10 | 14 |
| 1 | 5 | 9 | 13 |

270 DEGREE ROTATION

FIG. 10

VIDEO CODING USING FRAME ROTATION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for encoding a current block of a video frame according to an implementation of the disclosure comprises determining a number of degrees by which to rotate at least a portion of the video frame. At least the portion of the video frame is rotated according to the number of degrees to produce rotated pixel values for at least the portion of the video frame. A prediction residual is generated for the current block based on the rotated pixel values. The current block is then encoded based on the prediction residual.

A method for decoding an encoded block of an encoded video frame according to an implementation of the disclosure comprises decoding the encoded block to produce inverse transform pixel values. A number of degrees by which to inverse rotate at least a portion of the encoded video frame is determined. At least the portion of the encoded video frame is inverse rotated according to the number of degrees to produce inverse rotated pixel values for the inverse transform pixel values corresponding to at least the portion of the encoded video frame. The inverse rotated pixel values are then output to an output video stream.

An apparatus for decoding an encoded block of an encoded video frame according to an implementation of the disclosure comprises a processor configured to execute instructions stored in a non-transitory storage medium. The instructions include instructions to decode the encoded block to produce inverse transform pixel values. A number of degrees by which to inverse rotate at least a portion of the encoded video frame is determined. At least the portion of the encoded video frame is inverse rotated according to the number of degrees to produce inverse rotated pixel values for the inverse transform pixel values that correspond to at least the portion of the encoded video frame. The inverse rotated pixel values are then output to an output video stream.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

FIG. 10 is a diagram of examples of rotated pixel values of a block of a video frame according to numbers of degrees for rotating the video frame.

DETAILED DESCRIPTION

Video compression schemes may include breaking respective images, or video frames, into smaller portions, such as blocks, and generating an encoded bitstream using techniques to limit the information included for respective blocks thereof. The encoded bitstream can be decoded to re-create the source images from the limited information. The order in which the blocks of a video frame are encoded to or decoded from the encoded bitstream can be based on a raster or other scan order used by the encoder or decoder, respectively. However, that raster or other scan order may not always result in the best performance or efficiency of the encoder or decoder. For example, an object within an image represented by a video frame may be located wholly or partially on a block boundary (e.g., a boundary separating two or more blocks of the video frame). In some cases, the coding of this object may include additional performance costs, such as for reducing artefacts caused by the object being on a block boundary. In other cases, aspects of the object may not be properly coded, such as where the motion of the object is not correctly predicted.

Implementations of this disclosure include rotating video frames for encoding and decoding blocks therein to change the raster or other scan order for encoding or decoding those blocks. During an encoding process, a number of degrees to rotate a video frame is determined. The video frame is rotated to produce rotated pixel values. A prediction residual is then generated for a block to be encoded based on the rotated pixel values. That block is encoded based on the prediction residual. During a decoding process, an encoded block is decoded to produce inverse transform pixel values, and a number of degrees to inverse rotate an encoded video frame is determined. The encoded video frame is inverse rotated to produce inverse rotated pixel values corresponding to the inverse transform pixel values. The inverse rotated pixel values are then outputted to an output video stream. One or more syntax elements indicating the number of degrees can be encoded to a bitstream during encoding and decoded from the bitstream during decoding.

The changed raster or other scan order may result in higher encoding and decoding performance. For example, and as described above, a video frame may include an object located wholly or partially on a block boundary. However, when that video frame is rotated, the location of the object with respect to the block boundaries may change (e.g., such that the object is no longer located on a block boundary). In another example, the pixel values used to predict motion for blocks of a non-rotated video frame may be different from those used to predict motion for blocks of a rotated-version of that video frame. The use of frame rotation may therefore improve one or more aspects of the encoding and decoding processes, for example, motion prediction, loop filtering, or the like.

Figure 1:
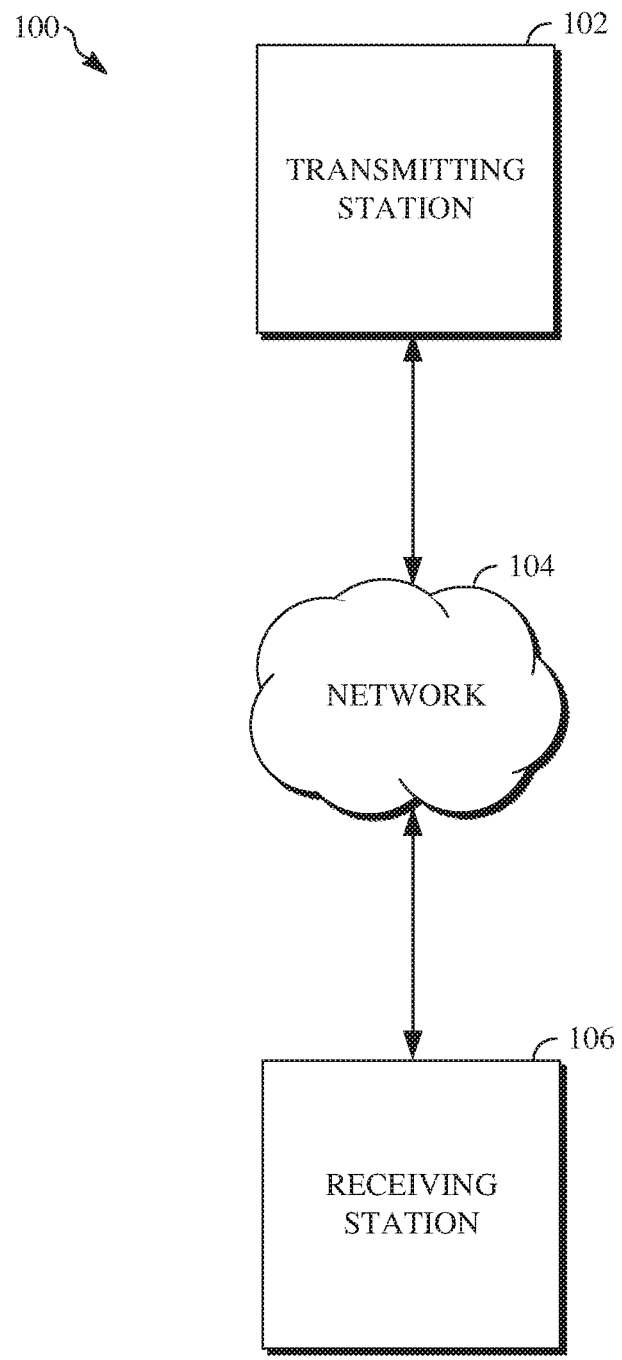
FIG. 1 is a schematic of a video encoding and decoding system.

Further details of techniques for video coding using frame rotation are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
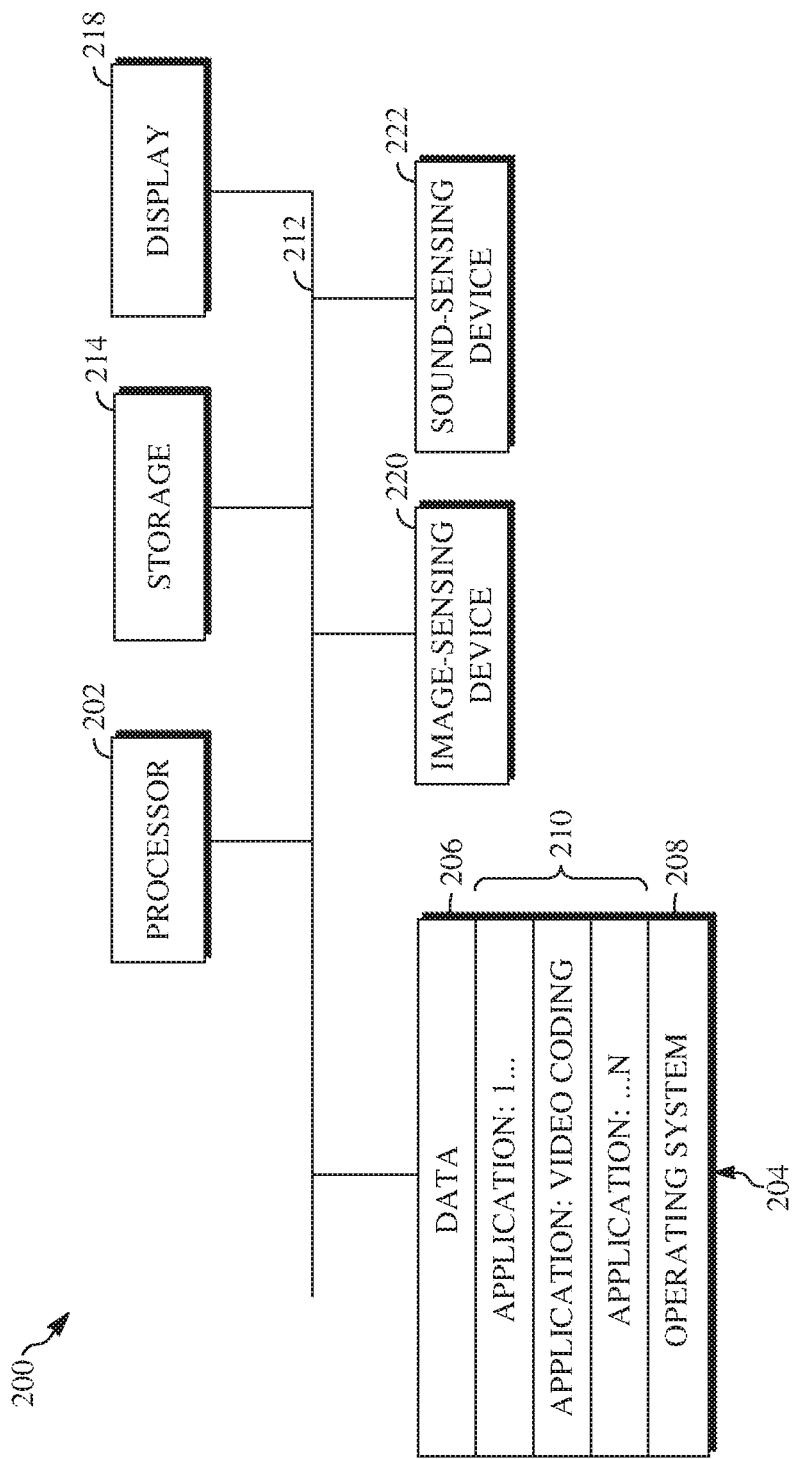
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
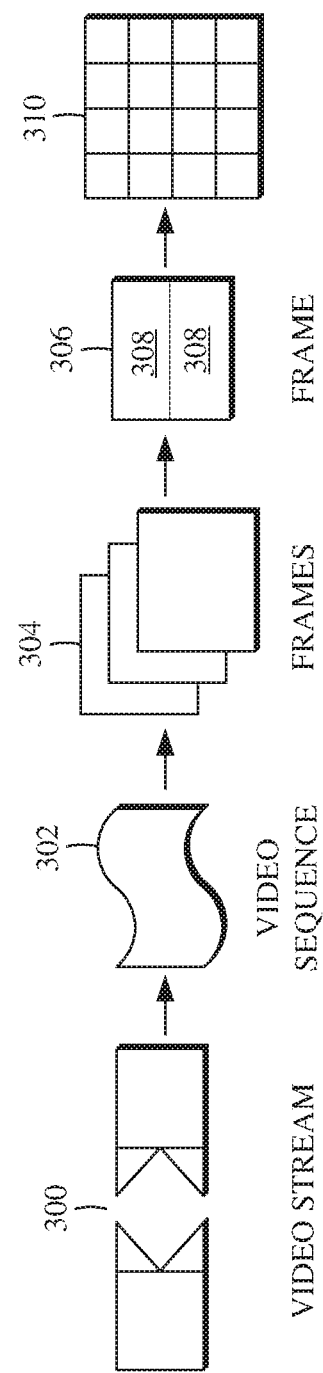
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
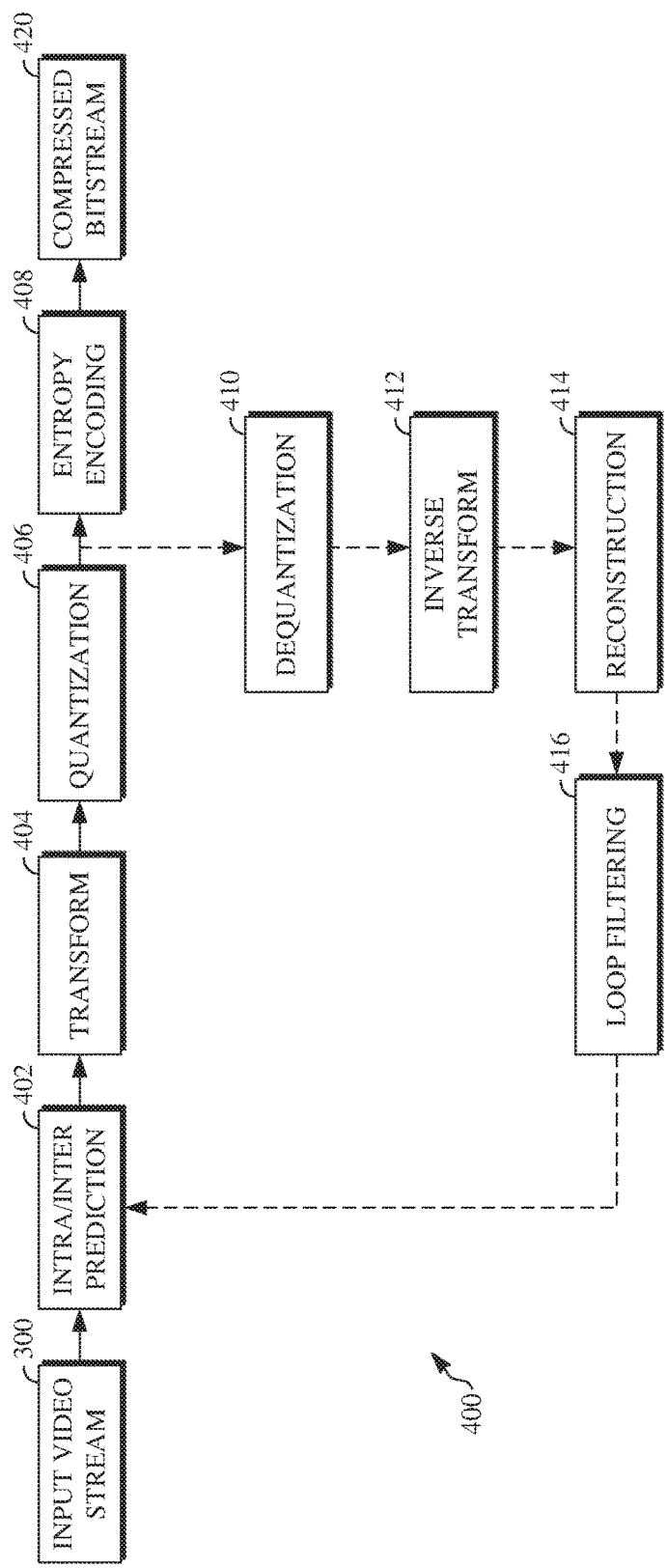
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
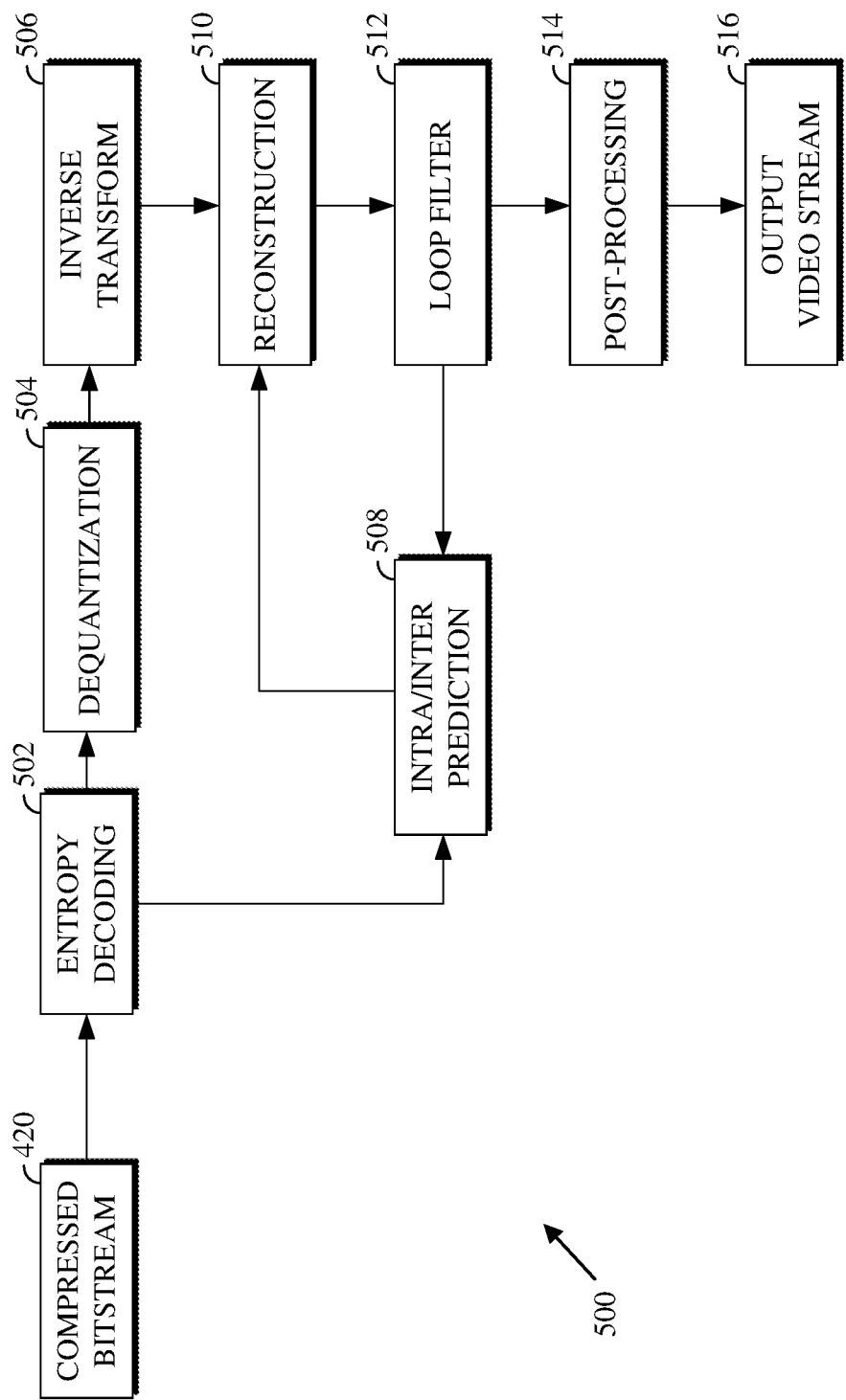
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
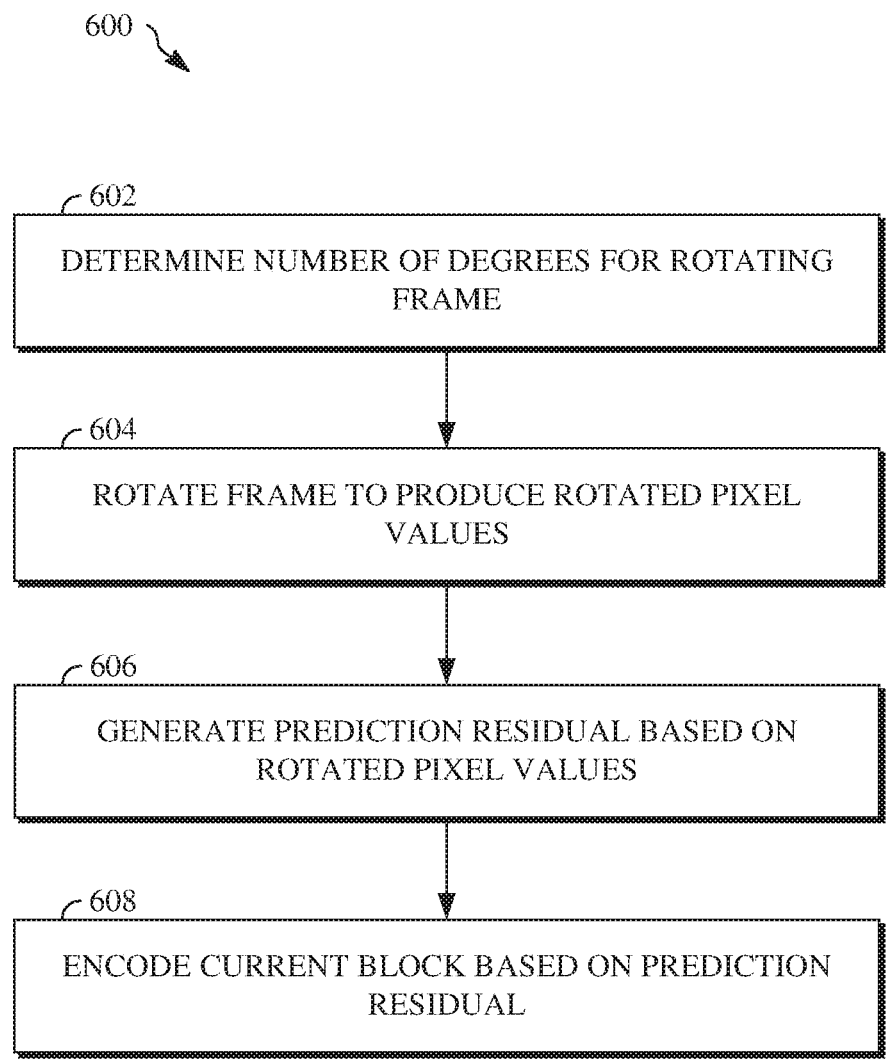
FIG. 6 is a flowchart diagram of an example of a technique for encoding a current block of a video frame using frame rotation.
Figure 7:
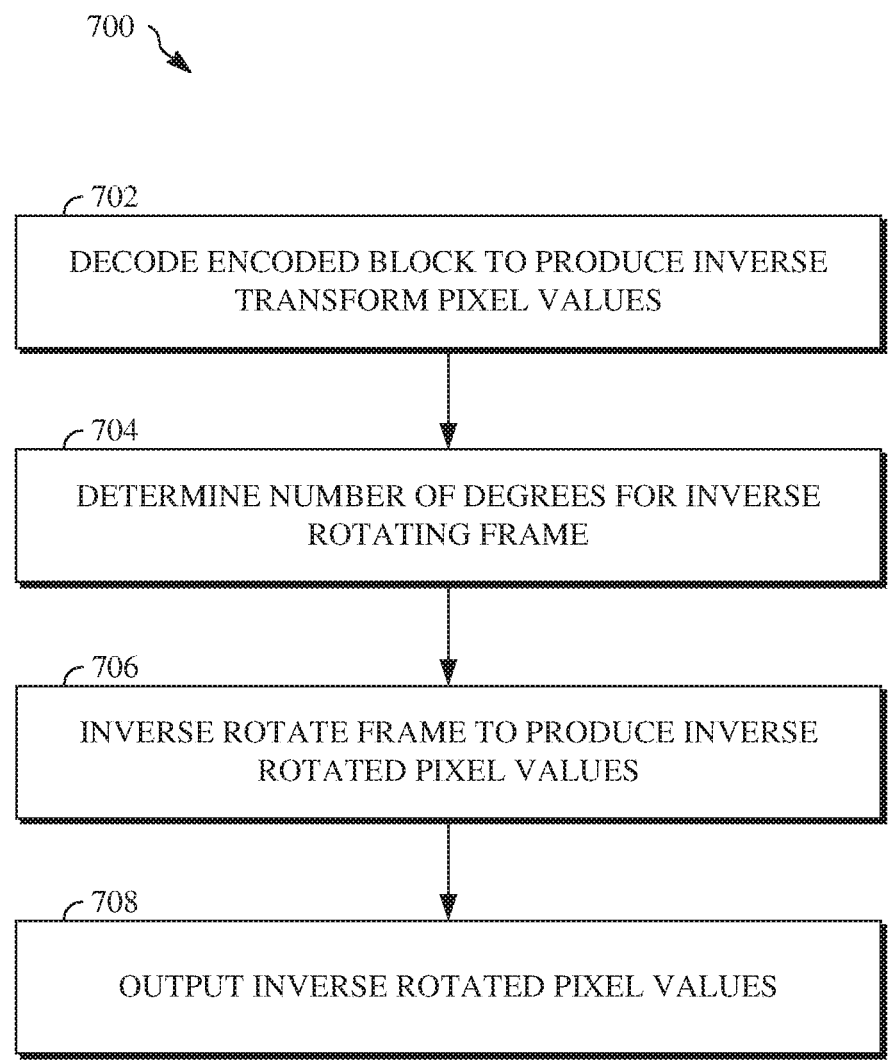
FIG. 7 is a flowchart diagram of an example of a technique for decoding an encoded block of an encoded video frame using frame rotation.

Techniques for video coding using frame rotation are now described with respect to FIGS. 6 and 7. FIG. 6 is a flowchart diagram of an example of a technique 600 for encoding a block of a video frame using frame rotation. FIG. 7 is a flowchart diagram of an example of a technique 700 for decoding an encoded block of an encoded video frame using frame rotation. One or both of the technique 600 or the technique 700 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 600 and/or the technique 700. One or both of the technique 600 or the technique 700 can be implemented using specialized hardware or firmware. As explained above, some computing devices may have multiple memories or processors, and the operations described in one or both of the technique 600 or the technique 700 can be distributed using multiple processors, memories, or both.

The technique 600 or the technique 700 may be performed as a method or process for video coding using frame rotation. The technique 600 or the technique 700 may be performed by an apparatus, device, system, or other machine or mechanism for video coding using frame rotation. For example, an apparatus may include a processor configured to execute instructions stored in a non-transitory storage medium to perform the technique 600 or the technique 700. For example, the transmitting station 102 may be an apparatus including a processor configured to execute instructions stored in a non-transitory medium to perform the technique 600. In another example, the receiving station 106 may be an apparatus including a processor configured to execute instructions stored in a non-transitory medium to perform the technique 700.

For simplicity of explanation, the technique 600 and the technique 700 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, a flowchart diagram of a technique 600 for encoding a current block of a video frame using frame rotation is shown. At 602, a number of degrees by which to rotate the video frame is determined. The number of degrees may be determined based on a rate-distortion analysis performed with respect to the possible numbers of degrees by which the video frame can be rotated. For example, determining the number of degrees can include determining rate-distortion values resulting from rotating at least the portion of the video frame according to respective numbers of degrees. A rate-distortion value refers to a ratio that balances an amount of distortion (e.g., a loss in video quality) with rate (e.g., a number of bits) for coding a block or other video component.

An encoder performing the technique 600 can perform the rate-distortion analysis by producing rate-distortion values for each of the possible numbers of degrees. The possible numbers of degrees by which the video frame can be rotated may be, for example, 0 degrees (e.g., no rotation), 90 degrees, 180 degrees, or 270 degrees. In cases where those are the four possible numbers of degrees, the encoder may accordingly produce four rate-distortion values. The rate-distortion values are compared to determine the lowest one. The number of degrees resulting in that lowest rate-distortion value can then be identified. As such, determining the number of degrees by which to rotate the video frame can include determining, calculating, or otherwise a lowest rate-distortion value. Alternatively, determining the number of degrees can include selecting the number of degrees, for example, based on results of a rate-distortion analysis. Other implementations for determining the number of degrees by which to rotate the video frame may also be possible.

At 604, the video frame is rotated according to the number of degrees. As a result of the rotation, the pixels in the video frame (e.g., in the current block to be encoded) become rotated. The rotation of the video frame therefore produces rotated pixel values. As used herein, a pixel value refers to a coefficient at a pixel location. A rotated pixel has the same value as it did before the video frame was rotated; however, the rotated pixel values appear in the video frame in a different raster or other scan order than they did before the rotation of the video frame. Rotating the video frame to produce the rotated pixel values can thus include performing a linear transformation against the pixel values of the video frame according to the number of degrees by which to rotate the video frame. The blocks of the video frame, or the video frame itself, can be represented as a two-dimensional matrix of pixel values. The linear transformation performed against the video frame therefore shifts the pixel values to reflect a geometric rotation of the video frame. Examples of linear transformations performed against pixel values are described below with respect to FIG. 10.

At 606, a prediction residual is generated for the current block based on the rotated pixel values. The prediction residual is generated by predicting motion in the current block using one or more intra-prediction modes and/or inter-prediction modes. The pixel values of the predicted motion are then subtracted from the pixel values of the current block to result in the prediction residual. For example, the prediction residual can be generated using operations performed by the encoder 400 shown in FIG. 4 (e.g., at the intra/inter prediction stage 402).

Rotating the video frame according to the number of degrees changes a raster or other scan order for encoding the blocks of the video frame. As such, the prediction residual generated for the current block may be different depending on the number of degrees by which the frame is rotated. The neighbor pixels available for intra-prediction may thus be different based on the orientation of the frame. For example, when an intra-prediction mode is used to prediction motion for a block of a video frame that is not rotated, the intra-prediction mode may consider the left and above neighbor blocks of that block; however, for a rotated video frame, that intra-prediction mode may instead consider below and right neighbor blocks of that block (e.g., where the video frame is rotated 180 degrees).

At 608, the current block is encoded based on the prediction residual. Encoding the current block based on the prediction residual can include performing one or more operations by an encoder to encode the current block to a bitstream. For example, coefficients of the prediction residual can be quantized and then transformed. The transformed coefficients can then be entropy encoded to an encoded bitstream (e.g., the compressed bitstream 420 shown in FIG. 4). The quantization, transformation, and entropy encoding may be performed, for example, using the encoder 400 shown in FIG. 4. The video frame is encoded to the bitstream at the same time as or after each the blocks included in the video frame are encoded thereto.

In some implementations, the technique 600 includes encoding one or more syntax elements indicative of the number of degrees to a bitstream to which the current block is encoded. For example, the one or more syntax elements may include one or more bits used to identify the number of degrees by which the video frame is rotated. For example, the one or more syntax elements can include two bits, where the value "00" reflects that a 0 degree rotation is used, the value "01" reflects that a 90 degree rotation is used, the value "10" reflects that a 180 degree rotation is used, and the value "11" reflects that a 270 degree rotation is used. However, other numbers of bits or values of those bits may be used. The one or more syntax elements may be encoded to the bitstream alongside the encoding of the current block, for example, as part of the operations performed at 608. Alternatively, the one or more syntax elements may be encoded to the bitstream in an operation separate from those performed at 608. The one or more syntax elements are encoded to the bitstream on a frame-by-frame basis. The one or more syntax elements can be encoded to a frame header of the video frame to which they correspond.

In some implementations, the technique 600 includes rotating some, but not all, of the video frame. For example, only a portion of the video frame may be rotated according to the number of degrees. The rotated pixel values produced as a result of the rotation may correspond only to that portion of the video frame rather than to the entire video frame. That is, the rest of the video frame would remain in a non-rotated state such that the pixel values located in those non-rotated portions would reflect the pixel values received as part of an input video stream (e.g., the input video stream 300 shown in FIG. 4).

In some implementations, other numbers of degrees may be available for rotating the video frame. In some implementations, when the number of degrees is determined to be 0 degrees, the technique 600 may omit operations for rotating the frame (e.g., by not performing the operations at 604). In such an implementation, the prediction residual generated at 606 can be generated based on the pixel values of the frame as received in an input video stream (e.g., the input video stream 300 shown in FIG. 4).

In some implementations, the technique 600 may be performed to encode data other than blocks of a video frame. For example, the technique 600 may be performed to encode an image. The image may be rotated according to a determined number of degrees. Pixel values representative of the rotated image data may then be encoded.

Referring next to FIG. 7, a technique 700 for decoding an encoded block of an encoded video frame using frame rotation is shown. At 702, the encoded block is decoded to produce inverse transform pixel values. Decoding the encoded block can include performing one or more operations by a decoder to decode the encoded block from an encoded bitstream. For example, data associated with the encoded block and encoded to the bitstream can be entropy decoded, dequantized, and then inverse transformed to result in or otherwise produce the inverse transformed pixel values. The encoded bitstream may, for example, be the compressed bitstream 420 shown in FIG. 4. The entropy decoding, dequantization, and inverse transformation may be performed, for example, using the decoder 500 shown in FIG. 5.

The encoded video frame and the encoded block may have been encoded in a rotated form (e.g., by an encoder rotating the video frame before encoding the blocks thereof or the frame itself). The entropy decoding, dequantization, and inverse transformation may thus be performed with respect to rotated pixel values of the encoded block. For example, a raster or other scan order for decoding encoded blocks of the encoded video frame can be based on the rotation applied to the video frame during an encoding process. Further operations for decoding the encoded block may also be performed before frame rotation occurs in the decoding process. For example, the encoded block and/or the encoded video frame may be reconstructed (e.g., based on operations performed at the reconstruction stage 510 shown in FIG. 5) before the encoded video frame is inverse rotated or other processing occurs.

At 704, a number of degrees by which to inverse rotate the encoded video frame is determined. Determining the number of degrees can include decoding one or more syntax elements indicative of the number of degrees from an encoded bitstream including the encoded video frame. For example, the one or more syntax elements may be encoded to the encoded bitstream (e.g., as part of a frame header of the encoded video frame) during an encoding process, such as with respect to the technique 600 shown in FIG. 6. The one or more syntax elements may include one or more bits used to identify the number of degrees by which the encoded video frame was rotated during the encoding process. For example, the one or more syntax elements can include two bits, and respective values of the two bits correspond to different numbers of degrees available for decoding an encoded block. For example, the value "00" reflects that a 0 degree rotation is used, the value "01" reflects that a 90 degree rotation is used, the value "10" reflects that a 180 degree rotation is used, and the value "11" reflects that a 270 degree rotation is used. However, other numbers of bits or values of those bits may be used.

At 706, the encoded video frame is inverse rotated according to the number of degrees. Inverse rotated pixel values are produced for the encoded video frame as a result of the inverse rotation. The inverse rotated pixel values are inversely-rotated ones of the inverse transform pixel values produced by decoding the encoded block of the encoded video frame. Inverse rotating the encoded video frame can include performing a linear transformation against the inverse transform pixel values according to the number of degrees. As described above with respect to FIG. 6, the encoded blocks of the encoded video frame, or the encoded video frame itself, can be represented as a two-dimensional matrix of pixel values. The linear transformation performed against the encoded video frame therefore shifts the pixel values to reflect a geometric rotation of the encoded video frame. Examples of linear transformations performed against pixel values are described below with respect to FIG. 10.

At 708, the inverse rotated pixel values are output to an output video stream. Outputting the inverse rotated pixel values to the output video stream can include outputting the decoded video frame including the inverse rotated pixel values. For example, the output video stream can be the output video stream 516 shown in FIG. 5.

In some implementations, decoding the encoded block at 702 can include decoding the encoded video frame. For example, decoding the encoded video frame can include decoding each of the blocks of the encoded video frame. For example, each of the blocks of the encoded video frame may be decoded before the number of degrees by which to inverse rotate the video frame is determined, before the inverse rotation is applied to the video frame, or the like.

In some implementations, the one or more syntax elements may be decoded separately from operations performed for determining the number of degrees by which to inverse rotate the video frame. For example, the one or more syntax elements may be decoded from the bitstream alongside the decoding the encoded block, for example, as part of the operations performed at 702. In another example, the one or more syntax elements may be decoded from the bitstream in an operation separate from the operations performed at 702 or 704. In some implementations, the operations performed at 704 can be performed before or at substantially the same time as the operations performed at 702.

In some implementations, the technique 700 includes inverse rotating some, but not all, of the video frame. For example, only a portion of the video frame may be rotated according to the number of degrees during an encoding process. The rotated pixel values produced as a result of the rotation may correspond only to that portion of the video frame rather than to the entire video frame. That is, only that portion of the video frame may be inverse rotated. The rest of the video frame would remain in the state or arrangement as received in the encoded bitstream such that the pixel values located in those non-inverse rotated portions would reflect the pixel values received as part of the encoded bitstream.

In some implementations, the number of degrees by which the encoded video frame can be inverse rotated may be one of 0 degrees, 90 degrees, 180 degrees, or 270 degrees. In some implementations, other numbers of degrees may be available for inverse rotating the video frame. In some implementations, when the number of degrees is determined to be 0 degrees, the technique 700 may omit operations for rotating the frame (e.g., by not performing the operations at 706). In such an implementation, the pixel values of the frame as received in the encoded bitstream can be output to an output video stream (e.g., the output video stream 516 shown in FIG. 5).

In some implementations, the technique 700 may be performed to decode data other than encoded blocks of an encoded video frame. For example, the technique 700 may be performed to decode an encoded image. The encoded image may be decoded and then inverse rotated according to a determined number of degrees. Pixel values representative of the inverse rotated image data may then be output.

Figure 8:
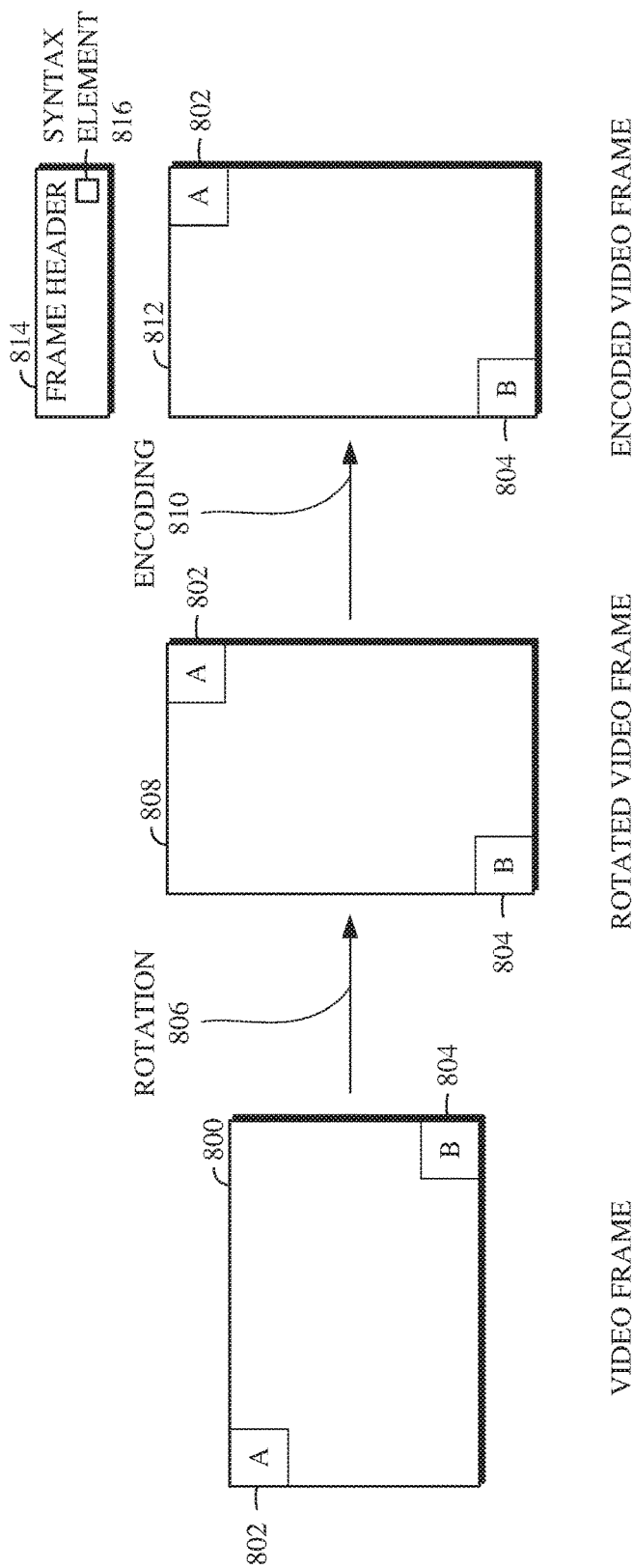
FIG. 8 is a diagram of an example of using frame rotation during an encoding process.
Figure 9:
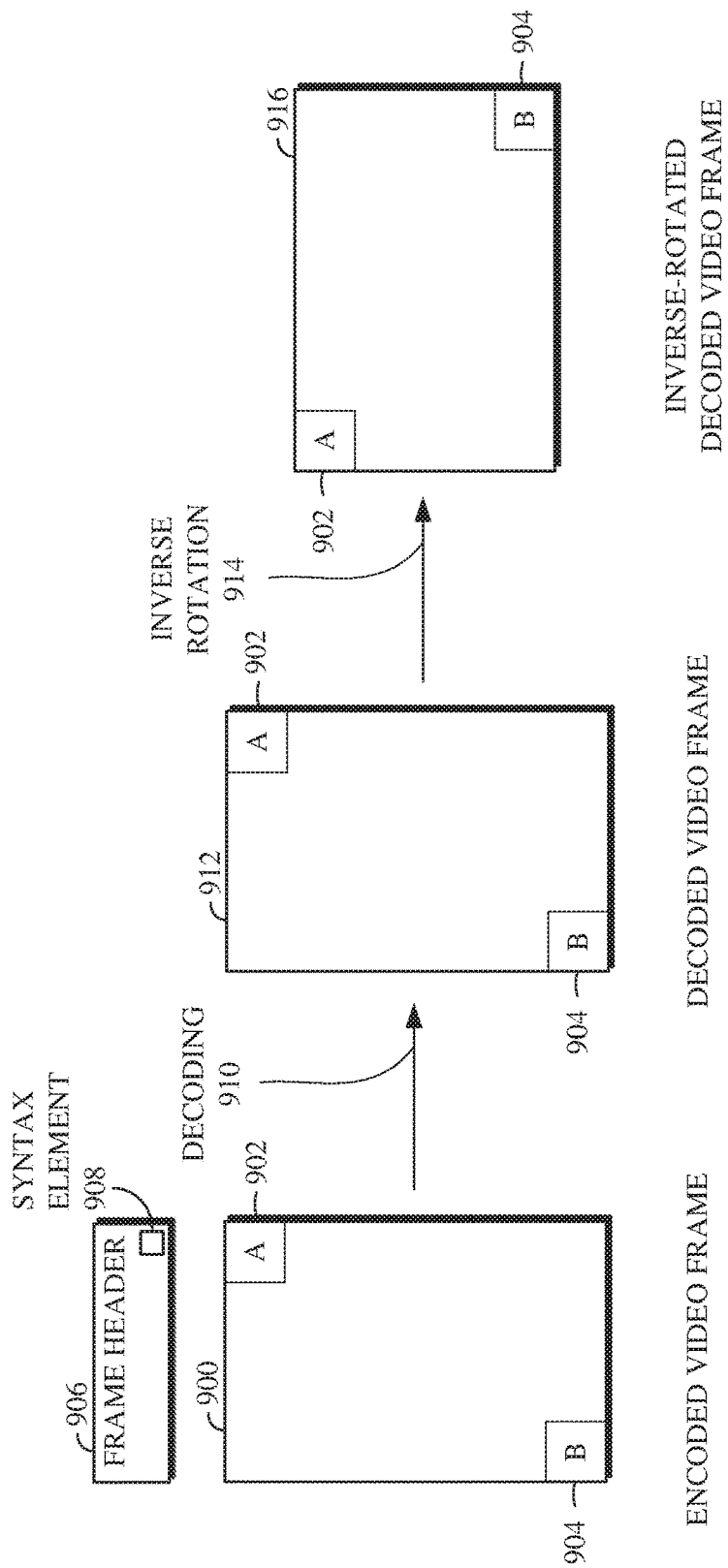
FIG. 9 is a diagram of an example of using frame rotation during a decoding process.

Further examples for video coding using video frame rotation are now described with respect to FIGS. 8-10. FIG. 8 is a diagram of an example of using frame rotation during an encoding process. A video frame 800 is shown as including a block A 802 and a block B 804. The video frame 800 reflects a video frame during an encoding process. For example, the video frame 800 can reflect a video frame received in an input video stream (e.g., the input video stream 300 shown in FIG. 4). All or a portion of the encoding process described with respect to the video frame 800 can be performed, for example, by the encoder 400 shown in FIG. 4.

A rotation 806 is applied to the video frame 800 to result in a rotated video frame 808. The rotated video frame 808 is shown as having been rotated 90 degrees based on the block A 802 moving from an upper-left position in the video frame 800 to an upper-right position in the rotated video frame 808, and by the block B 804 moving from a lower-right position in the video frame 800 to a lower-left position in the rotated video frame 808. However, the 90 degree rotation is one of multiple possible rotations that can be applied to the video frame 800.

The rotated video frame 808 undergoes encoding 810 to result in an encoded video frame 812. The encoding 810 may, for example, include prediction motion in the rotated video frame 808, quantizing a prediction residual therefor, transforming pixel values of the quantized prediction residual, and entropy encoding the transformed pixel values. The encoded video frame 812 can reflect a video frame that has been encoded to a bitstream (e.g., the output bitstream 420 shown in FIG. 4). For example, the encoded video frame 812 may be an encoded video frame included (or otherwise ready to be included) in the bitstream.

A frame header 814 of the encoded video frame 812 may also be encoded to the bitstream. The frame header 814 includes a syntax element 816. The syntax element 816 indicates the number of degrees by which the video frame 800 was rotated to result in the rotated video frame 808. The syntax element 816 may include one or more syntax elements. The syntax element 816 may include one or more bits for indicating values, such as of the different rotations that may have been applied to the video frame 800. For example, because a 90 degree rotation was applied to the video frame 800 to result in the rotated video frame 808, two bits representing the syntax element 816 encoded to the frame header 814 can reflect the value "01."

FIG. 9 is a diagram of an example of using frame rotation during a decoding process. An encoded video frame 900 is shown as including an encoded block A 902 and an encoded block B 904. The encoded video frame 900 reflects an encoded video frame at the beginning of a decoding process. For example, the encoded video frame 900 can be the encoded video frame 812 shown in FIG. 8. The encoded video frame 900 can be associated with a frame header 906. One or more syntax elements 908 may be encoded to the frame header 906. The frame header 906 and the one or more syntax elements 908 may, for example, respectively be the frame header 814 and the one or more syntax elements 816 shown in FIG. 8.

At 910, the encoded video frame 900 is decoded to produce a decoded video frame 912. The decoding at 910 can include one or more aspects of a decoding process performed against all or a portion of the encoded video frame 900. For example, the decoded video frame 912 can be the encoded video frame 900 after the encoded blocks thereof have been entropy decoded, dequantized, and inverse transformed. In another example, the decoded video frame 912 can further reflect an encoded video frame after a reconstruction thereof or of the encoded blocks thereof.

An inverse rotation 914 is applied to the decoded video frame 912. The inverse rotation 914 applied to the decoded video frame 912 can be determined based on the one or more syntax elements 908. An inverse-rotated decoded video frame 916 results from the inverse rotation 914. The decoded video frame 912 is shown as having been inverse rotated 90 degrees to result in the inverse-rotated decoded video frame 916, such as based on the block A 902 moving from an upper-right position in the decoded video frame 912 to an upper-left position in the inverse-rotated decoded video frame 916, and by the block B 904 moving from a lower-left position in the decoded video frame 912 to a lower-right position in the inverse-rotated video frame 916. The inverse-rotated decoded video frame 916 can reflect a video frame that has been decoded and output (or is ready to be output) to an output video stream (e.g., the output video stream 516 shown in FIG. 5).

FIG. 10 is a diagram of examples of rotated pixel values of a block of a video frame according to numbers of degrees for rotating the video frame. Blocks 1000, 1002, 1004, and 1006 may refer to the same block of the video frame and reflect different translations of the pixel values thereof based on the video frame rotation. Alternatively, the blocks 1000, 1002, 1004, and 1006 may refer to different blocks within one or more video frames. Although the blocks 1000, 1002, 1004, and 1006 are shown as 4×4 blocks, other sizes of blocks may be included in a video frame that is rotated (e.g., during an encoding process) and thereafter inverse rotated (e.g., during a decoding process).

The block 1000 shows a 0 degree rotation. As such, the pixel values of the block 1000 are the same before and after the 0 degree rotation is applied to the video frame including the block 1000. The block 1002 shows a 90 degree rotation. For example, the pixel values of the block 1002 before the 90 degree rotation is applied to the video frame including the block 1002 may be arranged as shown in the block 1000. After application of the 90 degree rotation, the pixel values of the block 1002 are translated 90 degrees to result in the arrangement shown. The block 1004 shows a 180 degree rotation. For example, the pixel values of the block 1004 before the 180 degree rotation is applied to the video frame including the block 1004 may be arranged as shown in the block 1000. After application of the 180 degree rotation, the pixel values of the block 1004 are translated 180 degrees to result in the arrangement shown. The block 1006 shows a 270 degree rotation. For example, the pixel values of the block 1006 before the 270 degree rotation is applied to the video frame including the block 1006 may be arranged as shown in the block 1000. After application of the 270 degree rotation, the pixel values of the block 1006 are translated 270 degrees to result in the arrangement shown.

FIG. 10 shows clockwise rotations of the blocks 1000, 1002, 1004, and 1006; however, in some implementations, the rotations of the blocks 1000, 1002, 1004, and 1006 may instead be counter-clockwise. For example, when the rotations are counter-clockwise, the block 1002 as shown in FIG. 10 may represent a 270 degree rotation instead of a 90 degree rotation. Similarly, the block 1006 as shown in FIG. 10 may represent a 90 degree rotation instead of a 270 degree rotation.

Further, other rotations may be possible, such as based on degree rotations other than 0, 90, 180, or 270. For example, other numbers of degrees may be used, such as in cases where only a portion of a video frame is rotated and the blocks to be coded therein are not orthogonally bounded. For example, the portion of the video frame may be rotated by 45 degrees, 135 degrees, 225 degrees, or 315 degrees. In another example, the portion of the video frame may be rotated by numbers of degrees that are not evenly spaced (e.g., 10 degrees, 97 degrees, 142 degrees, 165 degrees, 230 degrees, etc.).

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding a current block of a video frame to an encoded bitstream, the method comprising:
    determining a number of degrees by which to rotate at least a portion of the video frame, wherein an object is located on a block boundary within the portion of the video frame;
    rotating at least the portion of the video frame according to the determined number of degrees to produce rotated pixel values for at least the portion of the video frame, wherein at least some of the rotated pixel values correspond to the object, wherein rotating at least the portion of the video frame causes the object to no longer be located on the block boundary;
    generating a prediction residual for the current block based on the rotated pixel values; and
    encoding the current block to the encoded bitstream based on the prediction residual.

2. The method of claim 1, further comprising:
    encoding one or more syntax elements indicative of the determined number of degrees to the encoded bitstream.

3. The method of claim 1, wherein determining the number of degrees by which to rotate at least the portion of the video frame comprises:
    determining rate-distortion values resulting from rotating at least the portion of the video frame according to respective numbers of degrees; and
    identifying one of the respective numbers of degrees resulting in a lowest one of the rate-distortion values.

4. The method of claim 1, wherein rotating at least the portion of the video frame according to the determined number of degrees to produce the rotated pixel values for at least the portion of the video frame comprises:
    performing a linear transformation against pixel values of at least the portion of the video frame according to the determined number of degrees.

5. The method of claim 1, wherein rotating at least the portion of the video frame according to the determined number of degrees changes a raster order for encoding blocks of the video frame.

6. The method of claim 1, wherein the determined number of degrees is one of 0 degrees, 90 degrees, 180 degrees, or 270 degrees.

7. A method for decoding an encoded video frame to an output video stream, the method comprising:
    decoding the encoded video frame from an encoded bitstream to produce inverse transform pixel values;
    determining a number of degrees by which to inverse rotate at least a portion of the decoded video frame, wherein an object within the portion of the decoded video frame is located on a block boundary;
    inverse rotating at least the portion of the decoded video frame according to the determined number of degrees to produce inverse rotated pixel values for the inverse transform pixel values corresponding to at least the portion of the decoded video frame, wherein at least some of the inverse rotated pixel values correspond to the object, wherein inverse rotating at least the portion of the decoded video frame causes the object to be relocated on the block boundary; and
    outputting the inverse rotated pixel values to the output video stream.

8. The method of claim 7, wherein determining the number of degrees by which to inverse rotate at least the portion of the decoded video frame comprises:
    decoding one or more syntax elements indicative of the determined number of degrees from the encoded bitstream.

9. The method of claim 8, wherein the one or more syntax elements includes two bits, wherein one value of the two bits corresponds to the determined number of degrees, wherein other values of the two bits correspond to other numbers of degrees available for inverse rotating at least some of the decoded video frame.

10. The method of claim 7, wherein inverse rotating at least the portion of the decoded video frame according to the determined number of degrees to produce inverse rotated pixel values for the inverse transform pixel values corresponding to at least the portion of the decoded video frame comprises:
performing a linear transformation against at least some of the inverse transform pixel values according to the determined number of degrees, the at least some of the inverse transform pixel values located in at least the portion of the decoded video frame.

11. The method of claim 7, wherein at least the portion of the decoded video frame is inverse rotated according to the determined number of degrees subsequent to reconstructing the decoded video frame.

12. The method of claim 7, wherein a raster order for decoding encoded blocks of the encoded video frame is based on a rotation of the encoded video frame during encoding.

13. The method of claim 7, wherein the determined number of degrees is one of 0 degrees, 90 degrees, 180 degrees, or 270 degrees.

14. An apparatus for decoding an encoded video frame to an output video stream, the apparatus comprising:
a processor configured to execute instructions stored in a non-transitory storage medium to:
decode the encoded video frame from an encoded bitstream to produce inverse transform pixel values;
determine a number of degrees by which to inverse rotate at least a portion of the decoded video frame, wherein an object within the portion of the decoded video frame is not located on a block boundary;
inverse rotate at least the portion of the decoded video frame according to the determined number of degrees to produce inverse rotated pixel values for the inverse transform pixel values that correspond to at least the portion of the decoded video frame, wherein at least some of the inverse rotated pixel values correspond to the object, wherein inverse rotating at least the portion of the decoded video frame causes the object to be relocated on the block boundary; and
output the inverse rotated pixel values to the output video stream.

15. The apparatus of claim 14, wherein the instructions to determine the number of degrees by which to inverse rotate at least the portion of the decoded video frame include instructions to:
decode one or more syntax elements indicative of the determined number of degrees from the encoded bitstream.

16. The apparatus of claim 15, wherein the one or more syntax elements includes two bits, wherein one value of the two bits corresponds to the determined number of degrees, wherein other values of the two bits correspond to other numbers of degrees available for inverse rotating at least some of the decoded video frame.

17. The apparatus of claim 14, wherein the instructions to inverse rotate at least the portion of the decoded video frame according to the determined number of degrees to produce inverse rotated pixel values for the inverse transform coefficients that correspond to at least the portion of the decoded video frame include instructions to:
perform a linear transformation against at least some of the inverse transform pixel values according to the determined number of degrees, the at least some of the inverse transform pixel values located in at least the portion of the decoded video frame.

18. The apparatus of claim 14, wherein at least the portion of the decoded video frame is inverse rotated according to the determined number of degrees subsequent to a reconstruction of the decoded video frame.

19. The apparatus of claim 14, wherein a raster order for decoding encoded blocks of the encoded video frame is based on a rotation of the encoded video frame during encoding.

20. The apparatus of claim 14, wherein the determined number of degrees is one of 0 degrees, 90 degrees, 180 degrees, or 270 degrees.

* * * * *